Sept. 22, 1970  L. W. GUTH  3,530,306

DISHWASHER CONTROL CIRCUIT

Filed April 11, 1969

INVENTOR.
LAUREN W. GUTH
BY James E. Espe
HIS ATTORNEY

United States Patent Office 3,530,306
Patented Sept. 22, 1970

3,530,306
DISHWASHER CONTROL CIRCUIT
Lauren W. Guth, Louisville, Ky., assignor to General Electric Company, a corporation of New York
Filed Apr. 11, 1969, Ser. No. 815,327
Int. Cl. H01h 9/54
U.S. Cl. 307—136                               4 Claims

ABSTRACT OF THE DISCLOSURE

A control circuit is provided for an automatic dishwasher having a sequence control means, a motor and a heating means, wherein the motor winding and the heating means are connected in series across a source of power. Switching means having at least two operative positions shunts the heating means when in one position thereby connecting the motor winding directly across the source of power, and shunts the motor winding when in the second position thereby connecting the heating means directly across the source of power. By this arrangement, arcing within the switching means is minimized by causing the switching means to switch less volt-amperes than is delivered to either the heating means or to the motor winding when the switching means is positioned in either of the two operative positions.

BACKGROUND OF THE INVENTION

This invention relates generally to an improved control circuit for an automatic dishwasher and, more particularly, to an improved control circuit which enables the energization and de-energization of a motor by switching a lesser quantity of volt-amperes than is required for motor operation.

Heretofore, in dishwasher and other major appliance control circuits, it has been customary to use heavy duty contacts on one or more switches to withstand the arcing involved in energizing and de-energizing the motor circuit. Such requirement of the use of special contacts on the motor circuit switches presents a series of problems by adding to the cost of the control system and substantially complicating assembly. Furthermore, the arcing that is involved in switching the motor circuit significantly decreases the operational life of the motor circuit switches, despite the employment of heavy duty contacts.

Accordingly, it is an object of my invention to provide an improved control circuit for an automatic washing machine whereby arcing within a switching means forming a part of the circuit is minimized.

It is a further object of my invention to provide such an improved control circuit wherein the need for special, heavy-duty switch contacts is eliminated.

More particularly, it is an object of my invention to provide such an improved control circuit whereby the switching means is caused to switch less volt-amperes than is delivered through the switching means when current is flowing therethrough.

SUMMARY OF THE INVENTION

Briefly stated, in accordance with one aspect of the present invention, there is provided an automatic washing machine comprising a sequence control means to conduct the machine thorugh a series of operations, an electric motor to effectuate certain of the series of operations, and an electric heating means operable during at least a portion of the series of operation. The motor has at least one winding, and the motor winding and the heating means are adapted for connection in electrical series with respect to each other across a source of power. The sequence control means includes at least one switching means having at least two operative positions. In one of the positions, the switching means is operative to shunt the heating means, thereby connecting the motor winding directly across the source of power. In the second position, the switching means is operative to shunt the motor winding thereby connecting the heating means directly across the source of power. By this arrangement, the switching means is caused to switch less volt-amperes than is delivered to either the heating means or the motor winding when the switching means is positioned in either of the two operative position. Arcing within the switching means is thereby minimized.

BRIEF DESCRIPTION OF THE DRAWING

While the specification concludes with claims particularly pointing out and distinctly claiming the subject matter which is regarded as the invention, it is believed the invention will be better understood from the following description of the preferred embodiment taken in connection with the accompanying drawing, in which:

DESCRIPTION OF THE PREFERRED EMBODIMENT

Figure 1:
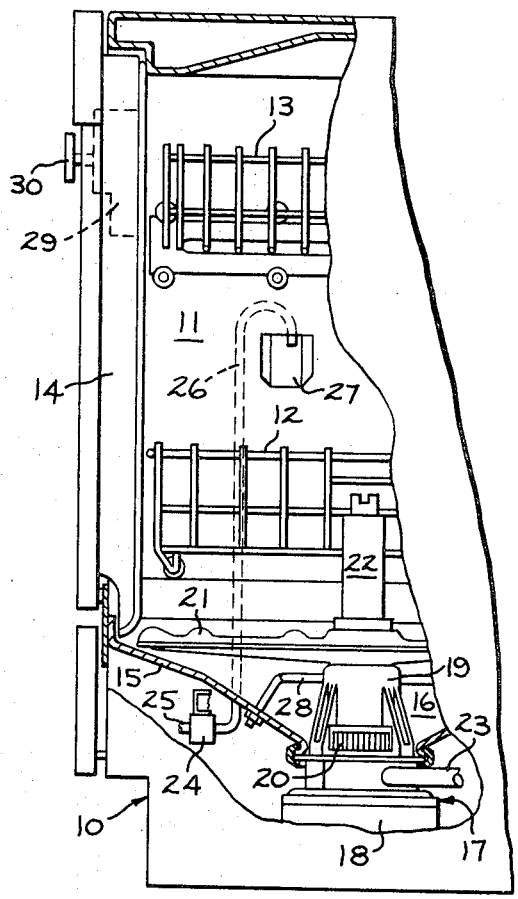
FIG. 1 is a partial side view, partially cut away to show details, of an automatic washing machine employing the present invention.

Referring now to the drawing, and initially to FIG. 1, there is illustrated an automatic washing machine in the from of an automatic dishwasher 10 having a wash chamber 11 within which are disposed dish supporting racks 12 and 13. A door 14 is provided to allow access to wash chamber 11 so that dishes or other articles to be washed may be placed into racks 12 and 13. Wash chamber 11 is defined at the bottom by wall 15 which has a centrally depressed portion forming a sump 16. Supported by bottom wall 15, generally in the center of sump 16, is a motor-pump unit 17 comprising a motor 18 and a pump 19. Pump 19 has an inlet 20 which draws wash fluid from sump 16 and, in one direction of rotation of motor 18, propels the wash fluid up through a reaction type spray arm 21 and an extendable spray tube 22 to create a wash action upon articles supported by racks 12 and 13. In the opposite direction of rotation of motor 18, pump 19 draws wash fluid from sump 16 through inlet 20 and propels it out through effluent discharge 23 which may communicate with a common household sewer system (not shown).

A valve 24 is provided to control the admission of wash fluids into chamber 11. A conduit 25 interconnects valve 24 with a wash fluid source (not shown). Conduit 26 interconnects valve 24 with an inlet port 27 formed in one wall of wash chamber 11 at a point sufficiently elevated to preclude loss of wash fluids therethrough. An electrical resistance heating means 28 is provided in wash chamber 11 to facilitate drying of the articles after they have been washed.

For purposes of illustration only, it will be understood that a typical full operating cycle of dishwasher 10 may include a suitable number of rinsing, washing and drying steps. For example, the cycle may include a preliminary rinse in which valve 24 is opened to allow the admission of wash fluid into chamber 11 and pump 19 is rotated by motor 18 for a short period of time, on the order of two minutes for example, to effect a spray action within chamber 11; then motor 18 is reversed to operate pump 19 and discharge the wash fluid from chamber 11 out through effluent discharge 23, and valve 24 is closed. This may be followed by a second preliminary rinse on the same order as described immediately above, and then by a washing step also similar to the first preliminary rinse except that the introduction of wash fluid and the circulation thereof by pump 19 continue for a longer period of time and, also, a detergent is employed during this time. There then follows at least one rinse step similar to the preliminary rinse described. Finally, a drying step of pre-determined length, in which heating means 28 is energized to cause evaporation of moisture from the dishes, may take place.

In order to control dishwasher 10 through a series of operations described in the proceeding paragraph, a sequence control means 29, having a manually operable knob 30, is conveniently positioned in the door 14, as shown in FIG. 1. To initiate dishwasher operation, control knob 30 is manipulated thereby causing sequence control means 29 to be energized. The sequence control means then remains energized throughout the entire wash cycle of the dishwasher and, upon termination of the last step in the operation of the dishwasher, the sequence control means de-energizes itself.

Figure 2:
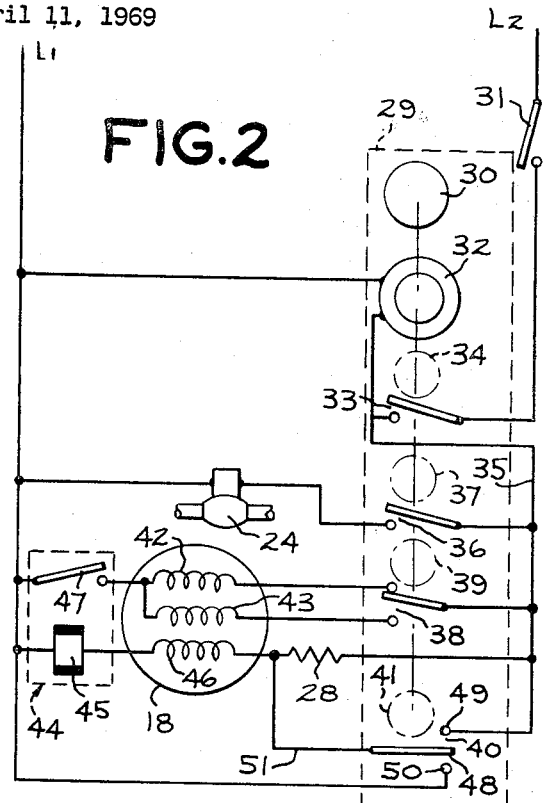
FIG. 2 is a schematic circuit diagram of a control means employing the present invention.

Referring now to FIG. 2, there is illustrated a schematic representation of the control circuitry of the present invention. A pair of power lines $L_1$ and $L_2$ may be connected to a suitable power source (not shown). Within power line $L_2$ there is positioned a master switch 31 which preferably is associated with the latch of door 14 such that the control system cannot be energized unless door 14 is properly latched. A timer motor 32 is connected in electrical series with a timer motor switch 33 between power lines $L_1$ and $L_2$. Timer motor switch 33 is controlled by a cam 34. It is to be understood that cam 34, and subsequent cams to be discussed, are driven by timer motor 32 and are also subject to rotation upon manual rotation of knob 30. This particular arrangement is essentially standard in control means for present day appliances.

Also housed within sequence control means 29 are a plurality of switches connecting with lead 35 which is in series with switch 33. Such switches include valve switch 36 operated by cam 37, start winding switch 38 operated by cam 39, and main winding and heater selector switch 40 operated by cam 41. Valve switch 36 is connected in electrical series with valve 24 between line $L_1$ and lead 35 such that when valve switch 36 is closed, valve 24 is energized and water is admitted to wash chamber 11. Start winding switch 38 is of the single pole double throw type whereby, depending upon the disposition of cam 39 power is admitted to one or the other of start windings 42 and 43 of drive motor 18. As is well known in the motor art, the direction of rotation of motor 18 is dependent upon which of the start windings 42 or 43 is energized. A start winding cut-out switch 44 includes a solenoid 45 in electrical series with main winding 46 of drive motor 18 and mechanically linked to switch 47 which is in electrical series with both start windings 42 and 43. By this arrangement, when motor 18 experiences an in rush of current into main winding 46, solenoid 45 will close switch 47 and cause switch 47 to remain closed until motor 18 reaches essentially its normal running speed, whereupon, the current passing through the solenoid 45 decreases and causes solenoid 45 to open switch 47 thereby de-energizing which ever start winding had been energized.

With the exception of switch 40, the control circuitry just described is essentially conventional and may be modified to some extent without materially affecting the present invention. For example, a liquid level responsive switch may be installed in series with valve 24 to make the operation of valve 24 further depend upon the level of liquid within wash chamber 11.

As mentioned earlier, one of the primary objects of this invention is to provide an improved control means whereby switch arcing within the motor circuit is minimized. In accordance with this object, I provide a motor circuit arrangement wherein main winding 46 and heating means 28 are connected in electrical series between power line L1 and lead 35. Switch 40 is of the single-pole double-throw type having a center position wherein no electrical connection is made between contacts 48, 49 and 50. Movable contact 48 is connected by conductor 51 to a point between motor winding 46 and heating means 28. Furthermore, contact 49 is connected to lead 35 and contact 50 is connected to line $L_1$. In a first operable position of switch 40 wherein connection is made between contacts 48 and 49, it will be seen that heating means 28 is shunted thereby connecting main motor winding 46 directly across line $L_1$ and lead 35. In a second operable position of switch 40 wherein connection is made between contacts 48 and 50, it will be seen that motor winding 46 is shunted, thereby connecting heating means 28 directly across line $L_1$ and lead 35.

By this arrangement of motor winding 46, heating means 28, and switch 40, the change in volt-amperes delivery to motor winding 46, occasioned by the opening or closing of contacts 48 and 49, is minimized and the change in volt-amperes delivery to the heating means 28, occasioned by the opening or closing of contacts 48 and 50 is also minimized. To illustrate these important advantages of my invention, reference will be made to the current flow from line $L_1$ to lead 35 when switch 40 is in each of its two operative positions, and when contact 48 is between those two positions. For purposes of this example, measurements have been taken employing a 1/3 horsepower motor and a 700 watt heater, with the voltage between line $L_1$ and lead 35 being 120 volts.

In order to start motor 18, switch 40 is moved from a position intermediate its two operable positions wherein contact 48 makes no connection with either contact 49 or contact 50, to the first operative position wherein connection is made between contacts 48 and 49. With switch 40 in the intermediate position, the path of current flow from line $L_1$ to lead 35 is through winding 46 and heating means 35. Such current flow has been measured to be approximately 5 amps and the voltage drop across heating means 28 is approximately 104 volts. With switch 40 in the first operative position, the path of current flow from line $L_1$ to lead 35 is through motor winding 46, lead 51 and contacts 48 and 49. The in-rush current flow here is approximately 26 amps and the voltage across heating means 28 is reduced to zero.

The amount of volt-amperes switched by closing contacts 48 and 49 may be calculated by multiplying the changes in voltage and current experienced by heating means 28 according to the formula $$(V_1-V_2)(I_2-I_1) = (104-0)(26-5) = 2184$$

volt-amperes. This is to be compared to the volt-amperes delivered to the motor winding 46 when contacts 48 and 49 are closed which is 120 volts $\times$ 26 amps=3120 volt-amperes. It may be seen, therefore, that switch 40 serves to start motor 18 by switching less volt-amperes than is delivered to the motor, in fact $$\frac{3120-2184}{3120}=30\%$$

less power than is delivered to motor winding 46.

The operation of motor 18 is terminated by opening contacts 48 and 49 by moving switch 40 to the intermediate position. During normal motor operation, the current flow through motor winding 46 is approximately 6.5 amperes resulting in a delivery of 780 volt-amperes to the motor. When switch 40 moves to the intermediate position, where, as previously described, the current flow from line $L_1$ to line 35 is approximately 5 amps resulting in a delivery of 600 volt-amperes to motor winding 46 and heating means 28. Hence the volt-amperes switched by opening contacts 48 and 49 is 780−600=180 volt-amperes. This is to be compared with the change of 780 volt-amperes which would be switched were switch 40 adapted to merely discontinue all current flow through motor winding 46 when contacts 48 and 49 are opened. Here the reduction in volt-amperes switched is $$\frac{780-180}{780}=77\%$$

In order to fully actuate heating means 28, switch 40 is moved from its intermediate position to its second operative position wherein connection is made between contacts 48 and 50. With switch 40 in the intermediate position, the current flow through heating means 28 is 5 amperes and the voltage drop thereacross is approximately 104 volts, resulting in a delivery of 520 volt-amperes. When connection is made between contacts 48 and 50, approximately 700 volt-amperes are delivered to heating means 28. Hence, the volt-amperes switched by closing contacts 48 and 50 is approximately 700−520=180 volt-amperes, which is a reduction of $$\frac{700-180}{700}=74\%$$

The movement of switch 40 from its second operative position to the intermediate position will terminate the full activation of heating means 28 and restore the series current flow through motor winding 46 and heating means 28.

It is therefore apparent that my arrangement of motor winding 46, heating means 28 and switch 40 will minimize arcing within switch 40 by causing switch 40 to switch less volt-amperes than is delivered through the switch contacts when connection is made therebetween. Such an arrangement has particular application to dishwasher wherein it is desirable to energize the motor winding and the heating means alternatively, and wherein both the motor winding and the heating means are so designed that neither will be injured by the supply of low voltage thereto for short periods of time as occurs when the switch 40 is positioned intermediate its two operative positions.

Figure 3:
FIG. 3 is a sequence control cam chart illustrating the sequence of operation of the schematically shown switches of FIG. 2.
Figure 3:
Figure 3:
Figure 3:
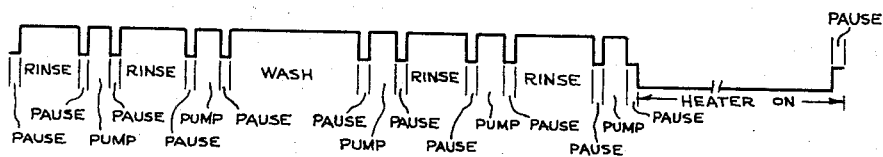

Reference to FIG. 3 will show the periods during which the aforementioned cam operated switches are closed during a complete cycling of the sequence control means 29. For example, it can be seen that the timer motor switch 33 is closed throughout the entire cycle while switches 36 and 38 operate during the cycle to initiate various functions.

With reference to the operation of switch 40 as shown by FIG. 3, another advantage of my invention may be illustrated. Both at the beginning and end of the cycle of switch 40, it will be seen that there is a short "pause" during which time the switch 40 assumes a position intermediate its two operative positions. During these pauses, it will be seen that timer switch 33 either opens or closes. By causing switch 40 to be so positioned during the operation of timer switch 33, both motor winding 46 and heating means 28 are connected in electrical series in the circuit switched by timer switch 33. Such an arrangement maximizes the resistance of this circuit, thereby minimizing the volt-amperes which is switched by switch 33.

As was previously mentioned, the control system of my invention is particularly adapted for use in automatic washing machines wherein it is desirable to minimize arcing within the switching means. From the foregoing description it should now be apparent that the present invention, by minimizing the change in volt-amperes occasioned by the opening and closing of the switch contacts, the tendency toward arcing within the switches is also minimized. Furthermore, by so minimizing the volt-amperes changed by opening and closing the switch contacts, the need for special, heavy-duty switch contacts is eliminated.

As will be evident from the foregoing description, certain aspects of the invention are not limited to the particular details of the construction of the example illustrated, and it is intended to cover such modifications and applications as do not depart from the true spirit and scope of the invention.

What is claimed as new and desired to be secured by Letters Patent of the United States is:

1. An automatic washing machine comprising:
   a sequence control means to conduct the machine through a series of operations;
   an electric motor to effectuate certain of said series of operations, said motor having at least one winding;
   an electric heating means operable during at least a portion of said series of operations;
   said motor winding and said heating means being connected in electrical series with respect to each other across a source of power;
   said sequence control means including at least one switching means;
   said switching means having at least two operative positions, one of said positions being operative to shunt said heating means and thereby connect said motor winding directly across said source of power, the second of said positions being operative to shunt said motor winding and thereby connect said heating means directly across said source of power;
   whereby arcing within said switching means is minimized by causing said switching means to switch less volt-amperes than is delivered through said switching means when said switching means is positioned in either of said operative positions.

2. The invention of claim 1 wherein:
   said sequence control means additionally includes a timer motor and a plurality of cams driven by said timer motor;
   said switching means includes a plurality of switches operated by said cams;
   one of said switches including at least three contacts;
   a first of said contacts being electrically connected between said motor winding and said heating means;
   a second of said contacts being connected to one side of said source of power;
   a third of said contacts being connected to the other side of said source of power;
   said one switch being adapted, in said one operable position, to connect said first contact with said second contact thereby shunting said motor winding, and being adapted, in said second operable position, to connect said first contact with said third contact thereby shunting said heating means; and
   said one switch being inoperative to shunt either said heating means or said motor winding when moving said first contact between said two operative positions.

3. The invention of claim 2 wherein:
   said plurality of switches additionally includes a line switch connected in electrical series with said timer motor across said source of power;
   said line switch additionally being operative to control the power delivered to the series connection of said motor winding and said heating means;
   said one of said switches being operable to move said first contact to a position intermediate said second and third contacts during such times as said line switch is opened or closed;
   whereby the resistance of the circuit to which said line switch controls the power supply is maximized during the opening or closing of said line switch thereby minimizing arcing within said line switch.

4. A control circuit for an electrical appliance employing two components each having an electrical resistance, comprising:
   a sequence control means to conduct the appliance through a series of operations;
   the components being adapted for connection in electrical series with respect to each other across a source of power;
   said sequence control means including at least one switching means;

said switching means having at least two operative positions, one of said positions being operative to shunt one of the components thereby connecting the other component directly across the source of power, the second of said positions being operative to shunt said other of the components thereby connecting said one component directly across the source of power;

whereby arcing within said switching means is minimized by causing said switching means to switch less volt-amperes than is delivered through said switching means when said switching means is positioned in either of said operative positions.

References Cited

UNITED STATES PATENTS

| 3,259,764 | 5/1966 | Kendt | 307—141 |
| 3,286,149 | 11/1966 | Cushing | 307—141.4 X |
| 3,448,287 | 6/1969 | Giammona | 307—136 |

ROBERT K. SCHAEFER, Primary Examiner

T. B. JOIKE, Assistant Examiner

U.S. Cl. X.R.

317—11